Figure 1:
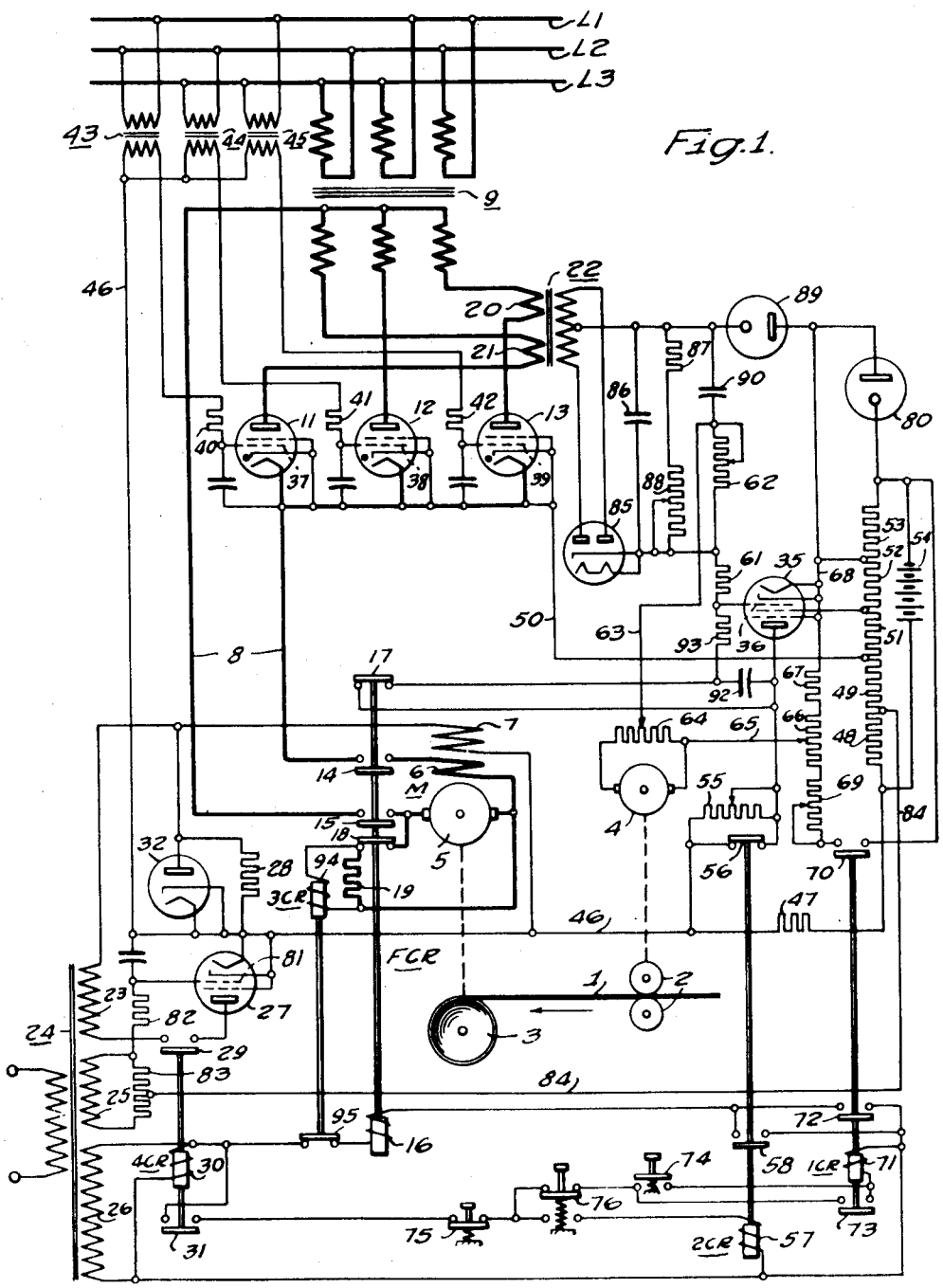

April 18, 1950    W. G. ROMAN    2,504,155
ELECTRONIC SYSTEM FOR OPERATING DIRECT-CURRENT
MOTORS FROM AN ALTERNATING-CURRENT SUPPLY
Filed May 5, 1948    2 Sheets-Sheet 1

INVENTOR
Walter G. Roman.
BY
ATTORNEY

April 18, 1950

W. G. ROMAN 2,504,155

ELECTRONIC SYSTEM FOR OPERATING DIRECT-CURRENT
MOTORS FROM AN ALTERNATING-CURRENT SUPPLY

Filed May 5, 1948

2 Sheets-Sheet 2

WITNESSES:

INVENTOR
Walter G. Roman
BY
ATTORNEY

Patented Apr. 18, 1950

2,504,155

UNITED STATES PATENT OFFICE 2,504,155

ELECTRONIC SYSTEM FOR OPERATING DIRECT-CURRENT MOTORS FROM AN ALTERNATING CURRENT SUPPLY

Walter G. Roman, Buffalo, N. Y., assignor to Westinghouse Electric Corporation, East Pittsburgh, Pa., a corporation of Pennsylvania Application May 5, 1948, Serial No. 25,194

17 Claims. (Cl. 318—6)

My invention relates to electronic systems for energizing a direct-current motor from an alternating-current supply to operate at a controllable and regulated speed.

It is an object of my invention to devise a system of this type that secures an accurate speed adjustment over a wide range, for instance up to 1 to 20 or more, with the aid of rugged and simple equipment and a lesser number of system components than heretofore necessary for systems of a comparable speed range and quality of performance.

Another object of the invention is to provide a system of the type referred to that is especially suitable and of improved speed regulating performance for operating as a winder drive, especially a core-type reel drive.

Another object of the invention aims at securing a wide range of speed control and a smooth speed regulation in which the motor is automatically and electrically controlled to always run under the highest possible armature voltage and the strongest possible field for any given speed, thus securing the lowest suitable armature current together with the strongest field and, consequently, the highest stability for any speed within the available range.

It is also an object of the invention to design such systems in such a manner as to provide a stable, predetermined and adjustable control of the starting and accelerating performance of the drive motor, thus avoiding overloads in the electric equipment as well as excessive strains or irregularities in the winding material; and it is also aimed at securing such an acceleration control by comparatively very simple and reliable electronic devices.

In order to achieve these objects, and in accordance with one of the features of my invention, I energize the armature circuit of a direct-current motor from the alternating-current supply through one or several controllable rectifier tubes, excite the motor field from the same supply through one or several other controllable rectifier tubes, and I jointly control the armature and field rectifiers by means of a master control tube in response to the motor speed, so that a change in the grid voltage conditions of a single master tube affects the armature current and field excitation of the motor in a desired relation to each other.

According to another feature of the invention, I impose on the armature and field rectifiers respective constant grid bias voltages of such correlation that the field rectifier starts reducing the field excitation only after the armature rectifier has gone substantially through its entire range of control, thus obtaining a drive system in which the armature voltage reaches its maximum before the normal motor field is weakened and, conversely, the field has full strength before the armature voltage is reduced.

According to another feature of the invention, I provide current limit and acceleration control means which respond to the current in the armature circuit of the motor and act on the grid circuit of the master control tube so that a speed reducing effect is imposed on the armature rectifier or the field rectifier or both, due to the above-mentioned joint control action which the master tube has on these rectifiers.

In still another aspect of the invention, I equip the system with operator-controllable inching means which cause the drive to operate at a predetermined low threading or inching speed independent of the normal speed setting of the system.

Figure 2:
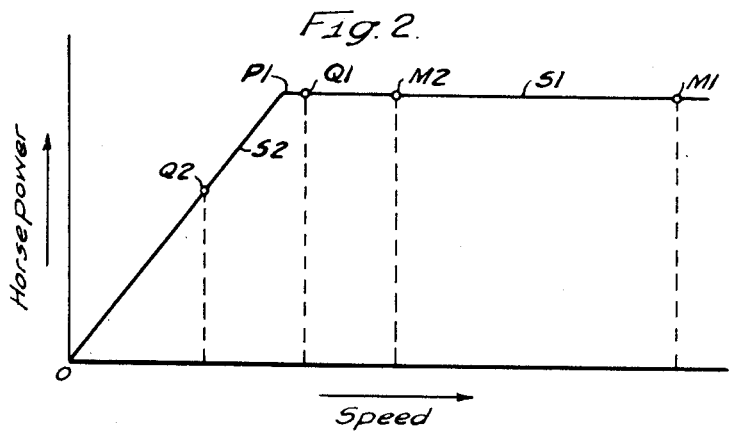
Figure 3:
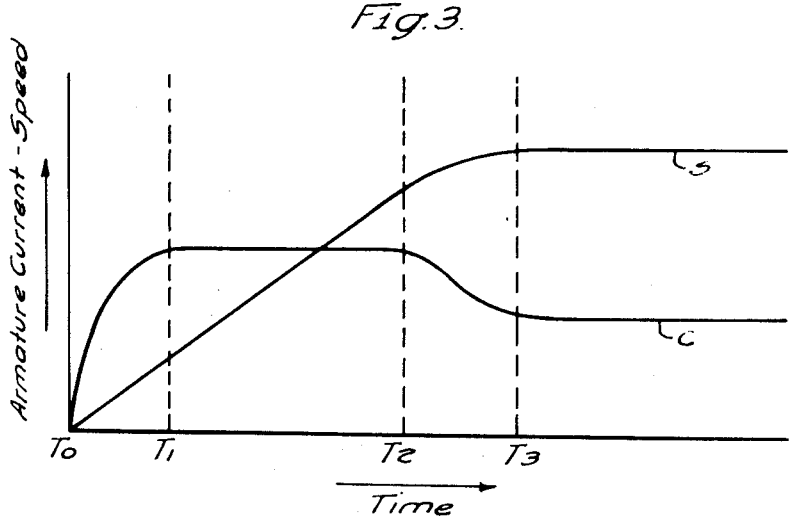

These and other objects and features of the invention will be apparent from the following description of the embodiment of a winder drive according to the invention illustrated in the drawing by a circuit diagram shown in Fig. 1, and two explanatory coordinate diagrams shown in Figs. 2 and 3 respectively.

The system shown in Fig. 1 serves to operate a winder for constant linear speed of the material to be wound onto or from a core-type reel. In order to present a concrete example of a drive system built and successfully operated, references are hereinafter made in parentheses to type designations of electronic tubes and to numerical values of electrical quantities. It should be understood that these references are given only by way of example and that the numerical values are mainly intended to denote preferable orders of magnitude and may be changed in accordance with the requirements and desiderata of each particular application.

The strip material 1, such as paper, textile or sheet metal, passes through guide rollers 2 onto a take-up reel 3. One of the rollers drives a tachometer generator 4 which provides a direct-current voltage in proportion to the linear traveling speed of the material. The reel core 3 is driven from the armature 5 of a direct-current motor M (for instance 3 H. P.) which is equipped with a series field winding 6, such as a compensating or interpole winding, and a separately excited main field winding 7.

The armature circuit 8 of motor M is energized from the secondaries of a power transformer 9 fed from the leads L1, L2, L3 of an alternating-current line. The transformer 9, shown symbolically, may consist of a customary multiphase transformer or of a group of single-phase transformers. Interposed between the armature and the secondaries of transformer 9 are controllable rectifier tubes 11, 12, 13, for instance thyratrons (type WL–105). These tubes, shown symbolically, are arranged for 3 phase half-wave rectification. While three tubes are shown, only two may be sufficient for some purposes while for obtaining a rectified current of greater smoothness or power a larger number, preferably four tubes, may be employed.

The armature circuit 8 extends through the contacts 14 and 15 of a contactor FCR whose coil 16 controls also two auxiliary contacts 17 and 18. Contact 18 connects a dynamic braking resistor 19 (2 to 10 ohms) across the armature 5 when the contactor is deenergized.

The armature circuit includes the primary windings 20 and 21 of a current transformer 22 whose secondary winding provides a voltage proportional to the rectified armature current supplied to the motor M.

The main field winding 7 of motor M is energized from the secondary 23 of a transformer 24 whose primary may be attached to the above-mentioned alternating-current line. Transformer 24 is equipped with two additional secondaries 25 and 26. The current from secondary 23 is rectified by a controllable rectifier tube 27, such as a thyratron (type WL–17). A load resistor 28 (5500 ohms) is connected in parallel to field winding 7 and the field circuit is controlled by the contact 29 of a field relay 4CR whose coil 30 also actuates an interlock contact 31. In order to obtain full-wave rectification for field winding 7, a diode 32 (type WL–866) is connected across the field winding 7 in inverse relation to tube 27. Tube 32 maintains the current flow through winding 7 during the non-conductive intervals of the controllable tube 27.

The armature rectifier tubes 11, 12, 13 and the field rectifier tube 27 are controlled by a single master control tube 35 whose control grid is denoted by 36. The tube 35 consists of an amplifying vacuum tube preferably a pentode (type 6V6). The control performance of master tube 35 will be understood from a study of the grid or control circuits appertaining to the armature and field rectifier tubes.

The control circuit for the armature rectifier tubes 11, 12, 13 extends from the appertaining control grids 37, 38, 39 through respective grid resistors 40, 41, 42, (each of 220,000 ohms) to grid transformers 43, 44, 45, respectively, which have a common lead 46. From lead 46, the control circuit extends through a load resistor 47 (30,000 ohms), and the resistance sections 48 (5,000 ohms) and 49 (1650 ohms) of a voltage dividing bleeder resistor to a lead 50 which is connected to the common cathode conductor of tubes 11, 12 and 13.

The just-mentioned grid circuit for tubes 11, 12, 13 includes three sources of component control voltages. One source is represented by the respective transformers 43, 44, 45 which impress on each tube an alternating component grid voltage. The phase connection of the grid transformers to the alternating-current line is such that the alternating component grid voltage for each tube lags about 90° behind the plate voltage of the same tube. The second source of control voltage is represented by the sections 48 and 49 of the bleeder resistor. These sections lie in series with additional sections 51 (1,500 ohms), 52 (2,300 ohms), and 53 (4,600 ohms) across a source of constant direct-current voltage. This source, symbolically shown at 54, may consist of a rectifier circuit energized from the above-mentioned alternating-current line. Source 54 impresses across the bleeder resistor (48, 49, 51, 52, 53) a constant voltage (470 volts). Consequently, the voltage drop across the resistor sections 48 and 49 in the control circuit of the armature rectifier tubes provides a constant grid bias (269 volts). This constant bias combines with the above-mentioned alternating component grid voltage to a periodic grid bias which is synchronous with the anode voltage and properly dephased. The third source of voltage in the control circuit for the armature rectifiers is represented by the load resistor 47. This resistor impresses on the circuit a unidirectional component grid voltage of variable magnitude which has the effect of raising or lowering the above-mentioned periodic grid bias thereby advancing or delaying the firing angle of the rectifier tubes, thus controlling the rectified voltage and current applied to the armature circuit of the motor.

In order to provide the just-mentioned variable unidirectional voltage, the resistor 47 is connected as a load in the plate circuit of the master tube 35. This plate circuit receives constant plate voltage from across the sections 48, 49, 51 and 52 (408 volts) of the bleeder resistor. The plate circuit includes a resistor 55 (15,000 ohms) normally shorted by the contact 56 of a relay 2CR whose coil 57 controls also an interlock contact 58.

It will be recognized that the voltage drop across the resistor 47 depends upon the conductance of the master tube 35. The conductance is controlled by the master tube grid circuit which extends from the control grid 36 of tube 35 through a resistor 61 (150,000 ohms), a resistor 62 (100,000 ohms) and a lead 63 to the adjustable tap of a potentiometric rheostat 64 (20,000 ohms) connected across the output terminals of the tachometer generator 4. From rheostat 64, the master tube grid circuit extends through a lead 65 to the tap of a speed control rheostat 66 (10,000 ohms) and thence through a resistor 67 (5,000 ohms) to the cathode lead 68 of master tube 35.

The master tube grid circuit just described includes two main sources of component grid voltage. One source is represented by the speed control rheostat 66 and provides a direct-current voltage whose magnitude determines the speed at which the motor M is supposed to run and is adjusted by the selected position of the rheostat slider. This adjusted voltage is derived from across section 53 of the bleeder resistor through the resistor 67 and a rheostat 69 (10,000 ohms) and, if necessary, may be stabilized by a voltage-regulating cold-cathode tube 80 (type OA3). The speed control voltage is effective only when a contact 70 is closed in a relay 1CR whose coil 71 also actuates two interlock contacts 72 and 73. The circuit of coil 71 includes a normally open "start" contact 74, a normally closed "stop" contact 75, and an "inch" contact 76. The second source of grid voltage in the master tube grid circuit is represented by the tapped-off portion of the tachometer rheostat 64. The speed-measuring voltage from rheostat 64 is series opposed to the speed control voltage from rheostat 66 so that the resultant grid voltage for master tube 35 substantially corresponds to the differential value of the two component voltages.

Before further explaining the performance of the tube circuits, a description of the functioning of the control contacts and electromagnetic relays will be given. Whenever the alternating-current line with transformer 24 are under normal operating voltage, relay 4CR is picked up and closes contacts 29 and 31. When then the start contact is temporarily depressed by the operator, relay ICR picks up and thereafter holds itself in at contact 73. Contact 72 of relay ICR energizes coil 16 so that the contactor FCR picks up and closes the armature circuit. The motor then accelerates to the speed set by the slider of speed control rheostat 66. The motor becomes deenergized when the operator causes relay ICR and contactor FCR to drop out by depressing the stop contact 75. The motor is then dynamically braked by means of resistor 19, and the relay 3CR prevents the contactor FCR from being reclosed as long as the motor speed is above a safe low value. The function of the inch contact 76 and relay 2CR will be referred to in a later place.

When the winder drive is in steady operation at the desired speed, the speed control voltage from rheostat 66 and the tachometer voltage from rheostat 64 balance each other to such an extent that a slight negative grid bias is impressed on the master tube 35 so that the conductance of this tube has the value required for maintainnig across the load resistor 47 a voltage drop just sufficient for holding the firing angle of the armature rectifiers 11, 12, 13 at the value corresponding to the proper motor armature voltage and speed. When the drive shows the tendency to increase its linear reeling speed above the proper value, the speed increase is sensed by the tachometer generator 4, and the grid 36 of master tube 35 becomes more positive relative to the cathode so that the voltage across resistor 47 is increased. As a result, the firing point of the rectifier tubes 11, 12, 13 is delayed thus reducing the armature voltage. Consequently, the system is automatically effective to return the reeling speed to the proper value. When the reeling speed drops below this value, the tachometer voltage drops also and causes the master tube 35 to decrease the voltage across resistor 47 with the effect of advancing the firing point of the armature rectifiers, thus compensating for the speed reducing tendency of the device.

If the just-mentioned control were effective only on the rectifier tubes in the armature circuit, the speed range within which the reeling speed may be adjusted and regulated would be comparatively limited. However, as mentioned above, the master tube 35 is also effective to control the field excitation of the motor M. To this end, the load resistor 47 which forms part of the master tube plate circuit is also connected in the grid circuit of the field rectifier tube 37.

The grid circuit for tube 27 extends from the appertaining control grid 81 through a resistor 82 (220,000 ohms) and a tapped portion of a potentiometric resistor 83 (20,000 ohms), a lead 84, the section 48 of the bleeder resistor, and through the load resistor 47 and lead 46 to the cathode of field rectifier tube 27. This grid circuit includes three sources of component grid voltage. One source is represented by the resistor section 48 which, energized from the source 54, provides a constant grid bias (191) volts. The second source of voltage is represented by the active portion of rheostat 83. This rheostat is connected across the transformer winding 25 and hence provides an alternating component grid voltage. The third source of voltage in the grid circuit of the field rectifier tube 27 is represented by the above-mentioned load resistor 47. As explained, this voltage is unidirectional and under control by the grid circuit of the master tube 35. The magnitude of the voltage from resistor 47 determines the conductance of the field rectifier tube 27 and consequently the amount of rectified excitation applied to the main field winding 7 of the motor. The constant and alternating components of grid voltage for tube 27 are adjusted so that the field control operates in a given cooperative relation to the control of the armature rectifier tubes as will be explained presently.

It has been mentioned that an increase in the voltage of the tachometer generator 4 causes an increase in the current flowing through the master tube 35 and hence an increase in the voltage across the load resistor 47 of the master tube with the result of delaying the firing points of the armature rectifier tubes 11, 12, 13. Since the load resistor 47 lies also in the grid circuit of the field rectifier 27, the just-mentioned increase in voltage across resistor 47 causes the firing point of the field rectifier to advance, thus strengthening the field excitation of the motor. Either or both of these rectifier controlling actions of the load resistor 47 results in a reduced speed of the motor and, therefore, tends to correct a speed excess shown by the voltage of the tachometer generator. Since the control circuit of the armature rectifier tubes and the grid circuit of the field rectifier tube may include differently dimensioned sections of the bleeder resistor (for example, as shown, sections 48 and 49 in the control circuit of the armature rectifier and section 48 in the grid circuit of the field rectifier), the constant component grid bias of the field rectifier can readily be adjusted so that the armature rectifiers cover their entire range of control before the field rectifier responds to the control action of the master tube. In this manner, the invention makes it possible to obtain a drive in which the armature voltage must be at maximum strength before the field can be weakened and, conversely, the field must be at full strength before the armature voltage can be reduced. In other words, at low speeds the motor field is maximum and the armature voltage is below maximum and, whenever the speed is increased by field weakening, the armature voltage is maximum. This is important because it means that the motor always runs at the highest possible armature voltage and strongest possible field for any given speed. This is very desirable since it insures the lowest possible armature current and also maximum speed stability because of the strong field.

The just-described joint control of the armature and field rectifiers by the master tube is effective not only during the automatic speed regulation so far explained, but is also effective during adjusted changes of motor speed. As mentioned, the speed is determined by the setting of the slider in speed control rheostat 66. Assume, for instance, that the motor is running at constant speed. The voltage from the active portion of rheostat 66 is then substantially balanced by the voltage of opposite polarity from across the tachometer rheostat 64 so that the resultant negative grid bias of a few volts on the master tube 35 maintains the amplified voltage across resistor 47 at a value corresponding to a definite firing angle of armature and field rectifiers. If, in order to increase the motor speed, the slider of rheostat 66 is moved away from the cathode of master tube 35 to another position, the voltage balance is momentarily disturbed, the control grid of master tube 35 becomes more negative. The voltage across resistor 47 decreases, and either the firing point of the armature rectifiers is phase-advanced or the firing point of the field rectifier is phase-retarded or both phase shifts take place successively as explained above. This results in an increase in motor speed, and the motor accelerates to a new speed at which a new balance of the system is established at a slightly more negative resultant grid voltage of the master tube. Conversely, the speed is decreased when the slider of rheostat 66 is displaced toward the master tube cathode.

The speed control performance just explained is elucidated by the schematic horsepower-speed diagram of Fig. 2. As mentioned, the field is not weakened until full armature voltage has been reached. Therefore, the speed characteristic follows, for instance, the curve S1. At lower speeds, up to point P1, the field has full strength and the speed change is due to change in armature voltage only. At speeds above P1, the speed control is due to field weakening only. Suppose the motor is adjusted for reeling at maximum speed M1 starts operating with an empty reel core. Then, as the reel of material builds up, the speed is reduced by field strengthening, for instance, down to the speed Q1 at the full reel. When it is desired to operate at a lower reeling speed, the control rheostat 66 is set accordingly so that the system becomes balanced at, say, one-half of the tachometer voltage previously effective. Then the motor would start operating for instance at the speed M2 with an empty reel core and would gradually reduce its speed according to speed curve S2 down, for instance, to speed Q2 at full reel.

The system is equipped with current limiting means for protecting the rectifier tubes and circuits from excessive overloads and also for controlling the acceleration of the motor when starting or when changing the speed adjustment. The current limiting devices are of the type also disclosed in the copending application Serial No. 25,156 of J. G. Haneiko, filed May 5, 1948, patented November 22, 1949, No. 2,488,536, assigned to the assignee of the present invention, and will be described presently.

A twin diode 85 (type 6X5) is connected to the secondary of the current transformer 22 for full wave rectification. The rectified voltage appears across a capacitor 86 (2 microfarad) and is impressed on a circuit of two series-connected resistors 87 (4700 ohms) and 88 (5000 ohms). One terminal of the resistor circuit is connected through a cold-cathode glow tube 89 (type OD3) with the cathode lead 68 of the master tube 35. The other terminal of the resistance circuit is connected through the above-mentioned resistor 61 with the control grid 36 of the master tube 35.

Since the secondary of transformer 22 is energized in accordance with the rectified current flowing through the armature 5, the rectified voltage impressed across resistors 87, 88 is proportional to the motor armature current. As long as this voltage stays below a given limit value, the above-described control performance of the system remains undisturbed. When the armature current and the voltage across resistors 87, 88 become so large that the voltage drop across tube 89 exceeds the breakdown voltage of the tube, the tube starts conducting. As a result, the circuit of resistors 87, 88 is effectively connected between the cathode and control grid of the master tube 35 and modifies the resultant grid voltage so as to decrease the firing angle of the armature rectifiers and, as the case may be, to increase the firing angle of the field rectifier. Thus current limit device takes over and by acting on either or both of the armature and field rectifiers, limits the motor speed in accordance with a predetermined maximum load current. This limit current can be adjusted by means of the rheostat 88.

The current limit device is also equipped with a capacitor 90 (.5 microfarad) which is series-connected with the rheostat 62 across the resistors 87 and 88. On sudden load changes, the capacitor charges or discharges and varies the voltage drop across rheostat 62 sufficiently to modify the master tube grid bias. Thus the circuit of capacitor 90 and rheostat 62 acts as a negative feedback circuit and stabilizes the master tube grid circuit to prevent oscillations. The negative feedback is adjustable by means of the rheostat 62. This feature is also disclosed in the copending application Serial No. 25,155 of J. G. Haneiko, filed May 5, 1948, assigned to the assignee of the present invention.

To obtain smooth starting and a smooth direct current in the master tube 35, a capacitor 92 (.1 microfarad) is series-connected with a resistor 93 (47,000 ohms) between the anode and control grid 36 of the master tube 35, and the capacitor 92 is shorted by the contact 17 of the armature contactor FCR whenever the contactor is dropped out. Capacitor 92 and resistor 93 represent for tube 35 a negative feedback circuit of the type also disclosed in the above-mentioned copending application Serial No. 25,156. The negative feedback reduces the gain of tube 35 as an alternating-current amplifier but does not disturb its action as a direct-current amplifier. Consequently, the unidirectional magnitudes of the resultant grid voltage applied to tube 35 are amplified to a much larger extent than any voltage ripples. In this manner, the stability of the control and regulating performance is further improved and a good tube balance is obtained at all speeds and loads of the motor.

A relay 3CR may be provided in order to prevent reclosing of the armature circuit when, after previous operation, the motor is as yet not braked to substantially standstill. Relay 3CR has a coil 94 connected across resistor 19 for opening a normally closed contact 95 in the coil circuit of contactor FCR when the voltage drop across resistor 19 is above a given low magnitude. When contactor FCR is deenergized and the motor at rest, the capacitor 92 is shorted and grid 36 is connected to the anode of tube 35 through resistor 93 and contact 17. Consequently, tube 35 is now conducting full current so that the control voltage across its load resistor 47 is a maximum and a high negative blocking voltage is impressed on the grids of the armature rectifiers 11, 12, 13, while the field rectifier 27 is fully conductive to apply maximum field excitation to the motor. When the start contact 74 is actuated and contactor FCR picks up and closes the armature circuit, capacitor 92 becomes effective and charges up. This delays the decay of the plate current of tube 35 and thus also the build up of current through the armature rectifier tubes 11, 12, 13. In this manner the circuit of capacitor 92 operates also as a starting device which causes the control voltage across resistor 47 to decline slowly and thus prevents high peak currents in the armature circuit during the first few cycles of the starting current. After capacitor 92 is fully charged, the above-described current limit device, energized from current transformer 22, takes over and controls the further acceleration of the motor until the motor approaches the desired speed and the armature current reaches its normal value at which the tachometer generator is effective to regulate the speed.

The just-mentioned conditions during starting periods are exemplified by the coordinate diagram of Fig. 3. The armature circuit is closed at the starting moment T0. The current C rises rapidly, and the motor accelerates according to speed curve S. At first, during the interval T0—T1, the starting circuit of capacitor 92 is effective to retard the rise in current and to prevent a high current peak until the capacitor is charged. Then, or whenever the armature voltage builds faster than the loaded motor can accelerate, the current limit device attached to transformer 22 takes over and remains effective up to a moment T2 at which the armature current C declines toward its normal value. Thereafter, at the moment T3, the speed S reaches its adjusted value and the tachometer-controlled speed regulation becomes effective.

On many drives, especially winder drives, it is necessary to thread the winding material at low speed without the normal speed regulation being effective. The above-mentioned inch contact 76 and relay 2CR are provided for this purpose. When the inch contact 76 is actuated, it deenergizes the relay 1CR and instead energizes the relay 2CR. Contact 56 of relay 2CR then places the resistor 55 in the plate circuit of the master tube 35, thus reducing the voltage drop across load resistor 47 to a low value corresponding to the desired threading speed, while the speed control rheostat 66 and tachometer generator 4 are ineffective due to the opening of contact 70 in relay 1CR. Contactor FCR is held picked up at contact 58 of relay 2CR, so that the motor runs at low threading speed determined by the selected or adjusted resistance value of resistor 55.

It will be apparent to those skilled in the art, after a study of this disclosure, that systems according to the invention can be altered and modified in various respects and, hence, that the invention can be embodied in specific designs and circuits other than the example illustrated and described, without departing from the objects and essential features of the invention and within the scope of the claims annexed hereto.

I claim as my invention:

1. An electronically controlled drive system, comprising a direct-current motor having an armature and a field winding, alternating-current supply means, a first controllable electronic rectifier connecting said armature to said supply means and having a control circuit, a second controllable electronic rectifier connecting said field winding to said supply means and having a first grid circuit, an electronic master tube having a plate circuit connected with said control circuit and with said first grid circuit for jointly controlling said rectifiers, said master tube having a second grid circuit, and grid voltage supply means connected with said second grid circuit and having circuit means associated with said motor to provide voltage indicative of the motor speed for controlling said master tube.

2. An electronically controlled drive system, comprising a direct-current motor having an armature and a field winding, alternating-current supply means, a first controllable electronic rectifier connecting said armature to said supply means and having a control circuit, a second controllable electronic rectifier connecting said field winding to said supply means and having a first grid circuit, an electronic master tube having a plate circuit connected with said control circuit and with said first grid circuit for jointly controlling said rectifiers, said master tube having a second grid circuit equipped with grid voltage supply means operatively associated with said motor for controlling said master tube in dependence upon the motor speed, said control circuit and said first grid circuit having voltage supply means for providing said rectifiers with respective constant bias voltages, and said bias voltages being dimensioned to let said second rectifier reduce the voltage of said field winding only after said first rectifier has increased the armature current substantially to its maximum.

3. An electronically controlled drive system, comprising a direct-current motor having an armature and a field winding, alternating-current supply means, a first controllable electronic rectifier connecting said armature to said supply means and having a control circuit, a second controllable electronic rectifier connecting said field winding to said supply means and having a first grid circuit, an electronic master tube having a plate circuit with a resistor and having a second grid circuit for controlling the voltage drop across said resistor, said resistor being connected in said control circuit and also in said first grid circuit for controlling said first and second rectifiers in dependence upon variations of said voltage drop, and speed-measuring voltage supply means associated with said motor and connected with said second grid circuit.

4. An electronically controlled drive system, comprising a direct-current motor having an armature and a field winding, alternating-current supply means, a first controllable electronic rectifier connecting said armature to said supply means and having a control circuit, a second controllable electronic rectifier connecting said field winding to said supply means and having a first grid circuit, an electronic master tube having a plate circuit with a resistor and having a second grid circuit for controlling the voltage drop across said resistor, said resistor being connected in said control circuit and also in said first grid circuit for controlling said first and second rectifiers in dependence upon variations of said voltage drop, speed-measuring voltage supply means associated with said motor and connected with said second grid circuit, and a source of constant grid bias voltage connected with said second grid circuit and having a voltage dimensioned to let said second rectifier reduce the voltage of said field winding only after said first rectifier has increased the armature current substantially to its maximum.

5. An electronically controlled drive system, comprising a direct-current motor having an armature and a field winding, alternating-current supply means, a first controllable electronic rectifier connecting said armature to said supply means and having a control circuit, a second controllable electronic rectifier connecting said field winding to said supply means and having a first grid circuit, an electronic master tube having a plate circuit connected with said control circuit and with said first grid circuit for jointly controlling said rectifiers, said master tube having a second grid circuit, an adjustable source of control voltage connected with said second grid circuit for providing a component grid voltage according to the desired motor speed, and another source of component grid voltage indicative of the motor speed, said other source being associated with said motor and connected with said second grid circuit in voltage opposition to said first source.

6. An electronically controlled drive system, comprising a direct-current motor having an armature and a field winding, alternating-current supply means, a first controllable electronic rectifier connecting said armature to said supply means and having a control circuit, a second controllable electronic rectifier connecting said field winding to said supply means and having a first grid circuit, an electronic master tube having a plate circuit connected with said control circuit and with said first grid circuit for jointly controlling said rectifiers, said master tube having a second grid circuit, a direct-current source of substantially constant voltage including potentiometric resistance means, said plate circuit being connected with said resistance means to be supplied with plate voltage from said source, said control circuit and said first grid circuit being also connected with said resistance means to be supplied with constant grid bias from said source, said second grid circuit having a speed control rheostat connected with said source to provide adjustable grid voltage for said master tube in accordance with the desired motor speed, and a source of speed responsive voltage associated with said motor and connected with said second grid circuit in voltage opposition to said rheostat.

7. An electronically controlled drive system, comprising a direct-current motor having an armature and a field winding, alternating-current supply means, a first controllable electronic rectifier connecting said armature to said supply means and having a control circuit, a second controllable electronic rectifier connecting said field winding to said supply means and having a first grid circuit, an electronic master tube having a plate circuit with a series resistor and having a second grid circuit for controlling the voltage drop across said resistor, said resistor being connected in said control circuit with such a polarity as to phase-delay the firing point of said first rectifier when said voltage drop varies in a given sense, said resistor being also connected in said first grid circuit with such a polarity as to phase-advance the firing point of said second rectifier when said voltage varies in said given sense, and speed-measuring voltage supply means associated with said motor and connected with said second grid circuit.

8. An electronically controlled drive system, comprising a direct-current motor having an armature and a field winding, alternating-current supply means, a first controllable electronic rectifier connecting said armature to said supply means and having a control circuit, a second controllable electronic rectifier connecting said field winding to said supply means and having a first grid circuit, an electronic master tube having a plate circuit with a series resistor and having a second grid circuit for controlling the voltage drop across said resistor, said resistor being connected in with such a polarity as to phase-delay the firing point of said first rectifier when said voltage varies in a given sense, said resistor being also connected in said first grid circuit with such a polarity as to phase-advance the firing point of said second rectifier when said voltage varies in said given sense, a source of constant grid bias connected with said second grid circuit and having a voltage dimensioned to let said second rectifier reduce the voltage of said field winding only after said first rectifier has increased the armature current substantially to its maximum, and speed-measuring voltage supply means associated with said motor and connected with said second grid circuit for controlling said master tube in dependence upon the motor speed.

9. An electronically controlled drive system, comprising a direct-current motor having an armature circuit and a field winding, alternating-current supply means, a first controllable electronic rectifier connecting said armature circuit to said supply means and having a control circuit, a second controllable electronic rectifier connecting said field winding to said supply means and having a first grid circuit, an electronic master tube having a plate circuit connected with said control circuit and with said first grid circuit for jointly controlling said rectifiers, said master tube having a second grid circuit, grid voltage supply means connected with said second grid circuit and having circuit means associated with said motor to provide voltage indicative of the motor speed for controlling said master tube, and current limit means connected with said armature circuit so as to respond to the current flowing in said armature circuit and connected with said second grid circuit to control said master tube for reducing the motor speed when said armature current increases above a desired value.

10. An electronically controlled drive system, comprising a direct-current motor having an armature circuit and a field winding, alternating-current supply means, a first controllable electronic rectifier connecting said armature circuit to said supply means and having a control circuit, a second controllable electronic rectifier connecting said field winding to said supply means and having a first grid circuit, an electronic master tube having a plate circuit connected with said control circuit and with said first grid circuit for jointly controlling said rectifiers, said master tube having a second grid circuit, grid voltage supply means connected with said second grid circuit and having circuit means associated with said motor to provide voltage indicative of the motor speed for controlling said master tube, circuit means connected with said armature circuit to provide a control voltage proportional to the current in said armature circuit, a two-electrode glow discharge tube connected with said circuit means to become conductive when said control voltage exceeds a given value, and circuit means connecting said glow discharge tube with said second grid circuit for controlling said master tube toward reduced motor speed in response to conductance of said glow tube.

11. An electronically controlled drive system, comprising a direct-current motor having an armature circuit and a field winding, alternating-current supply means, a first controllable electronic rectifier connecting said armature circuit to said supply means and having a control circuit, a second controllable electronic rectifier connecting said field winding to said supply means and having a first grid circuit, an electronic master tube having a plate circuit connected with said control circuit and with said first grid circuit for jointly controlling said rectifiers, said master tube having a second grid circuit, grid voltage supply means connected with said second grid circuit and having circuit means associated with said motor to provide voltage indicative of the motor speed for controlling said master tube, a current transformer connected with said armature circuit, a rectifier connected to said transformer, adjustable rheostat means connected to said rectifier to be impressed by rectified voltage proportional to the current in said armature circuit, a two-electrode glow tube connected with said rheostat means to become conductive when said current exceeds a value adjusted by said rheostat means, said glow tube being connected with said second grid circuit for controlling said master tube toward reduced motor speed in response to conductance of said glow tube.

12. An electronic system for a winder drive, comprising a direct-current reel drive motor having an armature and a field winding, a tachometer generator responsive to the reeling speed, alternating current supply means, a first controllable rectifier connecting said armature to said supply means and having a control circuit, a second controllable electronic rectifier connecting said field winding to said supply means and having a first grid circuit, an electronic master tube having a plate circuit connected with said control circuit and with said first grid circuit for jointly controlling said rectifiers, said master tube having a second grid circuit, a direct-current source of adjustable voltage connected with said second grid circuit to provide it with reference voltage according to the desired reeling speed, and circuit means connecting said generator with said second grid circuit in voltage opposition to said reference voltage.

13. An electronic system for a winder drive, comprising a direct-current reel drive motor having an armature and a field winding, a tachometer generator responsive to the reeling speed, alternating-current supply means, a first controllable rectifier connecting said armature to said supply means and having a control circuit, a second controllable electronic rectifier connecting said field winding to said supply means and having a first grid circuit, an electronic master tube having a plate circuit connected with said control circuit and with said first grid circuit for jointly controlling said rectifiers, said master tube having a second grid circuit, circuit means connecting said generator with said second grid circuit in voltage opposition to said reference voltage, a resistor disposed in said plate circuit, and operator-actuable contact means for controlling said resistor to cause said rectifiers to operate said motor at a low threading speed when said contact means are actuated.

14. An electronic system for a winder drive, comprising a direct-current reel drive motor having an armature and a field winding, a tachometer generator responsive to the reeling speed, alternating-current supply means, a first controllable rectifier connecting said armature to said supply means and having a control circuit, a second controllable rectifier connecting said field winding to said supply means and having a first grid circuit, an amplifying master tube having a plate circuit with a load resistor and having a second grid circuit for controlling the voltage drop across said load resistor, said load resistor being connected in said control circuit and also in said first grid circuit for controlling said first and second rectifiers in dependence upon said voltage drop, a direct-current source of adjustable voltage connected with said second grid circuit to provide it with reference voltage according to the desired reeling speed, said generator being connected with said second grid circuit in voltage opposition to said reference voltage, a resistor disposed in said plate circuit, operator-actuable contact means connected across said resistor to change said voltage drop for a reduced threading speed of said motor when said contact means are actuated.

15. In a system according to claim 14, said resistor being series-connected with said load resistor and normally shorted by said contact means so as to be effective only when said contact means are actuated, and said contact means being connected with said source to eliminate said reference voltage when said contact means are actuated.

16. An electronically controlled drive, comprising alternating-current supply means, a direct-current drive motor, an electronic rectifier connecting said motor to said supply means and having a control circuit for controlling the motor speed, an amplifier tube having a plate circuit with a first resistor and having a grid circuit for controlling the voltage drop across said resistor, said resistor being connected in said control circuit for controlling the motor speed in dependence upon said voltage drop, an adjustable first circuit means for providing a speed control voltage, second circuit means associated with said motor for providing a voltage substantially proportional to the motor speed, said first and second circuit means being connected with said grid circuit in mutually opposed voltage relation, a second resistor series connected with said first resistor in said plate circuit, operator-actuable contact means having a contact normally shorting said second resistor and having another contact connected with said first circuit means so as to eliminate said reference voltage and open the short circuit of said second resistor when said contact means are actuated whereby said motor is caused to run at a predetermined low speed.

17. An electronically controlled drive system, comprising a direct-current motor having an armature circuit and a field winding, alternating-current supply means, a first controllable electronic rectifier connecting said armature circuit to said supply means and having a control circuit, a second controllable electronic rectifier connecting said field winding to said supply means and having a first grid circuit, an electronic master tube having a plate circuit connected with said control circuit and with said first grid circuit for jointly controlling said rectifiers, said master tube having a second grid circuit, grid voltage supply means connected with said second grid circuit and having circuit means associated with said motor to provide voltage indicative of the motor speed for controlling said master tube, current limit means connected with said armature circuit so as to respond to the current flowing in said armature circuit and connected with said second grid circuit to control said master tube for limiting the armature current during accelerating periods of said motor, said master tube having an anode and a control grid and a feedback circuit connecting said anode and said grid and comprising a capacitor and a resistor in series connection with each other so that, when said motor is started, said capacitor charges and causes said master tube to delay the build-up of said armature current before said limit means become effective.

WALTER G. ROMAN.

REFERENCES CITED

The following references are of record in the file of this patent:

UNITED STATES PATENTS

| Number | Name | Date |
|---|---|---|
| 1,655,039 | Alexanderson et al. | Jan. 3, 1928 |
| 1,847,934 | Elder | Mar. 1, 1932 |
| 2,294,709 | Beachmann et al. | Sept. 1, 1942 |
| 2,312,117 | Moyer et al. | Feb. 23, 1943 |